US006285761B1

(12) United States Patent
Patel et al.

(10) Patent No.: US 6,285,761 B1
(45) Date of Patent: *Sep. 4, 2001

(54) METHOD FOR GENERATING PSEUDO-RANDOM NUMBERS

(75) Inventors: Sarvar Patel, Montville; Ganapathy Subramanian Sundaram, Scotch Plains, both of NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,829

(22) Filed: Mar. 4, 1998

(51) Int. Cl.$^7$ ....................................................... H04L 9/28
(52) U.S. Cl. ................................. 380/44; 380/28; 380/45; 380/46; 380/47; 708/250; 708/251
(58) Field of Search ................................. 380/44, 46, 45, 380/47; 708/256, 251, 252, 253, 255, 254, 250

(56) References Cited

PUBLICATIONS

B. Schneier, Applied Cryptography, Second Edition ©'96 pp. 416–418.*
"Applied Cryptography," 2nd ed., by Bruce Schneier, pp. 13–15, 28–29, 151–155, 158–165, 265–267, 1996.*
The discrete logarithm modup a composite hides $O(n)$ bits, 1993.*
Bruce Schneier, "Applied Cryptography," 2nd Edition, pp. 28, 29, 397, 416–418, and 725, 1995.*
Rene Peralta, "Simultaneous Security Bits In the Discrete Log," in Advances in Cryptology Eurocrypt '85, pp. 62–72, 1986.*
S. Pohlog & M. Hellman, "An Improved Algorithm for Computing Logarithms over GF(P) and its Cryptographic Significance," IEEE Trans. on Info Theory, vol. 1, No. 1, Jan 1978.*

* cited by examiner

*Primary Examiner*—Gail Hayes
*Assistant Examiner*—James Seal

(57) ABSTRACT

The present invention is a method for outputting larger bit size pseudo-random number $z_i$ that is cryptographically secure. Since larger bit size pseudo-random numbers are being outputted, larger bit size segments of messages may be encrypted resulting in a speedier encryption process than encryption processes of the prior art. In one embodiment, the present invention is a pseudo-random number generator defined by a modular exponential function $$x_i = g^{x_{i-1}} \bmod p.$$

The output of the pseudo-random number generator being a pseudo-random number $z_i$ comprising a j−1 bit size segment of $x_i$. The value of j being less than or equal to m−2c (i.e., j≤m−2c). In an embodiment of the present invention, the pseudo-random number $z_i$ includes the j least significant bits of $x_i$ excluding the least significant bit of $x_i$.

8 Claims, 2 Drawing Sheets

METHOD FOR GENERATING PSEUDO-RANDOM NUMBERS

FIELD OF THE INVENTION

The present invention relates generally to cryptography and, in particular, to pseudo-random number generators.

BACKGROUND OF THE RELATED ART

Pseudo-random generators are used in some forms of cryptography to provide secured communication means for the transmission of messages between a transmitter and a receiver. Security is provided such that only an intended receiver can understand a message (e.g., voice or data) transmitted by an authorized transmitter, and only the authorized transmitter can send the message to the intended receiver. The challenge of cryptography is to change a message into a form that only the intended receiver can comprehend. This must be done in a way that is both economical for the transmitter and for the intended receiver. At the same time, it must be very difficult (in terms of time and/or processing capabilities) for an unauthorized receiver (i.e., not the intended receiver) to comprehend the message. As unauthorized receivers and unauthorized transmitters become more sophisticated, the need for secured communications become greater.

FIG. 1 depicts a functional block diagram of a transmitter 10 in the prior art having a cryptographic device for encrypting messages. The cryptographic device comprising pseudo-random number (PN) generator 12 and XOR operator 14. PN generator 12 is defined by the following modular exponential function:

$$x_i = g^{x_{i-1}} \bmod p \quad \text{(equation 1)}$$

wherein $x_i$ is a value comprising m bits, p is a prime number comprising k bits, g is a generator of integer mod p, and $1 < i \leq n$. Since equation 1 is a modular exponential function, the value of m should be less than or equal to k (i.e., $m \leq k$). Value $x_i$ is generated initially by providing PN generator 12 with seed value $x_0$, which is a secret value comprising m bits and known only to the authorized transmitter and the intended receiver. Thus, value $x_1$ is equal to $g^{x_0} \bmod p$. Value $x_1$ is used to generate $x_2$ (i.e., $x_2 = g^{x_1} \bmod p$), which is then used to generate $x_3$, and so on.

PN generator 12 outputs a pseudo-random number $z_i$ comprising a d bit size segment of $x_i$. The pseudo-random number $z_i$ is then used to encrypt a d bit size segment of a message to be transmitted. Specifically, XOR operator 14 receives as inputs the message segment and the pseudo-random number $z_i$. The message segment is XOR with the pseudo-random number $z_i$ to produce a d bit size encrypted message segment. The values of d, m, and k depend, in part, on the degree of cryptographic security (or difficulty) sought to be attained, as will be described herein.

Cryptographic security depends on two factors: (1) the degree of difficulty in solving a discrete logarithm problem for $x_i$, and (2) the degree of difficulty in breaking the pseudo-random number generator given one or more pseudo-random numbers $z_i$ (comprising d bits). Assuming all m bits of $x_i$ are available, solving a discrete logarithm problem for $x_i$ involves the determination of $x_{i-1}$ such that $x_i = g^{x_{i-1}} \bmod p$. A discrete logarithm problem is considered computationally hard, and therefore cryptographically secure, if $2^c$ number of operations are required to solve it, wherein c represents a cryptographic security threshold level. The standard belief is that a discrete logarithm problem is hard if it takes at least $2^{64}$ number of operations to solve it (i.e., $c \geq 64$).

A discrete logarithm problem can be solved by a variety of techniques. The two most efficient techniques being the well-known index calculus technique and square root technique. To solve the discrete logarithm problem for $x_i$ using the index calculus technique, it would require $$\text{operations}_{index} = O(2^{\alpha \sqrt{\log_2 p} \times \sqrt{\log_2 \log_2 p}}) \quad \text{(equation 2)}$$

number of operations, wherein α is a constant. If c=64, the hard threshold (of $2^{64}$ number of operations) is met when p comprises at least 512 bits (i.e., $k \geq 512$). Thus, the value selected for k is dependent upon the value of c. By contrast, to solve the discrete logarithm problem for $x_i$ using the square root technique, it would require $$\text{operations}_{sq\text{-}rt} = \sqrt{2^m} \quad \text{(equation 3)}$$

number of operations. If c=64, the hard threshold is met when $x_i$ comprises at least 128 bits (i.e., $m \geq 128$). Thus, the value of m is also dependent upon the value of c.

As mentioned earlier, solving the discrete logarithm problem for $x_i$ assumes all m bits of $x_i$ are available. If only d bit size segments of $x_i$ (i.e., pseudo-random number $z_i$) are available, then the predecessor step to solving the discrete logarithm problem for $x_i$ is to somehow determine all m bits of $x_i$. This is the aforementioned second factor of cryptographic security, which involves breaking the pseudo-random number generator given one or more pseudo-random number $z_i$. A pseudo-random number generator is considered cryptographically secure if, given one or more pseudo-random numbers $z_i$, all m bits of $x_i$ would be difficult to predict or determine. It is believed that if the PN generator outputs smaller bit size pseudo-random numbers $z_i$ (i.e., small segments of $x_i$), less data would be available to a cryptanalyst to use to predict any other bits of $x_i$. The exact size of pseudo-random number $z_i$ being outputted would depend on the degree of cryptographic security sought to be attained—that is, the value of d is dependent upon the value of c.

Blum-Micali presented a PN generator which outputted pseudo-random numbers $z_i$ comprising only the most significant bit of $x_i$, i.e., d=1. Blum-Micali showed that the degree of difficulty in breaking this PN generator is equivalent to the degree of difficulty in solving a discrete logarithm problem for the modular exponential function of $x_i$. Thus, if solving the discrete logarithm problem for $x_i$ is hard, then breaking Blum-Micali's PN generator (outputting pseudo-random numbers $z_i$ comprising only the most significant bit) is also hard.

By contrast, Peralta presented a successor PN generator which outputted pseudo-random numbers $z_i$ comprising $\log_2 m$ most significant bits, i.e., $d = \log_2 m$. For example, if $x_i$ comprises 512 bits, then the PN generator would output pseudo-random numbers $z_i$ comprising no more than the nine (i.e., $\log_2 512$) most significant bits of $x_i$. Or if $x_i$ comprises 1024 bits, then the PN generator would output pseudo-random numbers $z_i$ comprising no more than the ten (i.e., $\log_2 1024$) most significant bits of $x_i$. Peralta showed that the degree of difficulty in breaking this PN generator is also equivalent to the degree of difficulty in solving the discrete logarithm problem for the modular exponential function of $x_i$. Thus, if solving the discrete logarithm problem for $x_i$ is hard, then breaking Peralta's PN generator (outputting pseudo-random numbers $z_i$ comprising only $\log_2 m$ most significant bits) is also hard.

Although encryption processes that use the PN generators presented by Blum-Micali and/or Peralta are cryptographically secure, these PN generators output pseudo-random numbers $z_i$ comprising no more than $\log_2 m$ bits of $x_i$. Since log$_2$ m is a relatively small value, only small bit size segments of messages can be encrypted for every pseudo-random numbers $z_i$ outputted by the PN generator. This results in a slower encryption process because more pseudo-random numbers $z_i$ have to then be outputted to encrypt the entire message. Accordingly, there exists a need for a pseudo-random number generator that outputs larger bit size pseudo-random numbers $z_i$ and is cryptographically secure.

SUMMARY OF THE INVENTION

The present invention is a method for outputting larger bit size pseudo-random number $z_i$ that is cryptographically secure. Since larger bit size pseudo-random numbers are being outputted, larger bit size segments of messages may be encrypted resulting in a speedier encryption process than encryption processes of the prior art. In one embodiment, the present invention includes a pseudo-random number generator defined by a modular exponential function $$x_i = g^{x_{i-1}} \bmod p,$$

wherein $x_i$ is a value comprising m bits, p is a prime number comprising k bits, g is a generator of integer mod p, $m \leq k$, and $1 < i \leq n$. The values of m and k being selected to make solving the discrete logarithm for the modular exponential function of $x_i$ hard. The output of the pseudo-random number generator is a pseudo-random number $z_i$ comprising aj–1 bit size segment of $x_i$. The value of j being less than or equal to m–2c (i.e., $j \leq m-2c$). In an embodiment of the present invention, the pseudo-random number $z_i$ includes the j least significant bits of $x_i$ excluding the least significant bit of $x_i$. The output of the pseudo-random number generator is then used to encrypt an equal size segment of a message to be transmitted.

Advantageously, the present invention uses larger bit size pseudo-random numbers $z_i$ to encrypt messages, thus resulting in an encryption process that is faster than encryption processes of the prior art that use smaller bit size pseudo-random numbers $z_i$ (e.g., pseudo-random numbers comprising log$_2$ m bits). Although the use of larger bit size pseudo-random numbers is counter intuitive to prior art cryptographic security beliefs with respect to breaking the pseudo-random number generator, the present invention utilization of larger bit size pseudo-random numbers $z_i$ is cryptographically secure. Specifically, the degree of difficulty in breaking the pseudo-number generator of the present invention is equivalent to the degree of difficulty in solving the discrete logarithm for a short exponential function $y = g^s \bmod p$, wherein y is a value comprising m bits, s is a short exponent comprising 2c bits, p is the prime number comprising k bits, g is the generator of integer mod p, c represents a cryptographic security (or difficulty) threshold level, and $2c << m \leq k$. The values of c and k being selected to make solving the discrete logarithm for the short exponential function of y hard.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
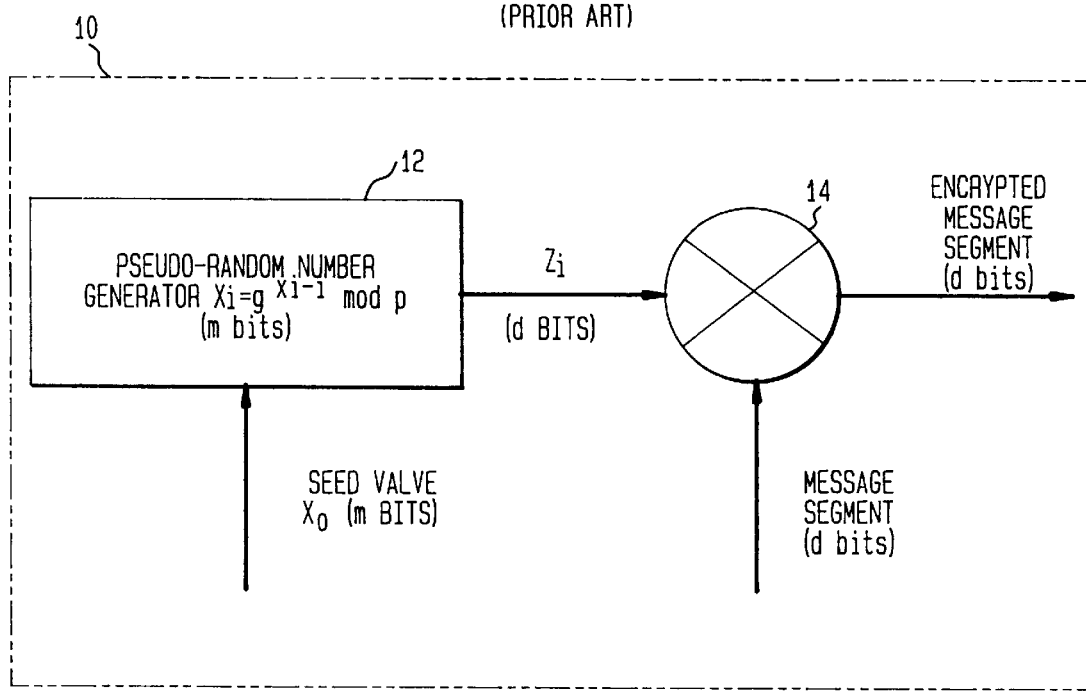
FIG. 1 depicts a functional block diagram of a transmitter in the prior art having a crytographicdevice for encrypting messages.
Figure 2:
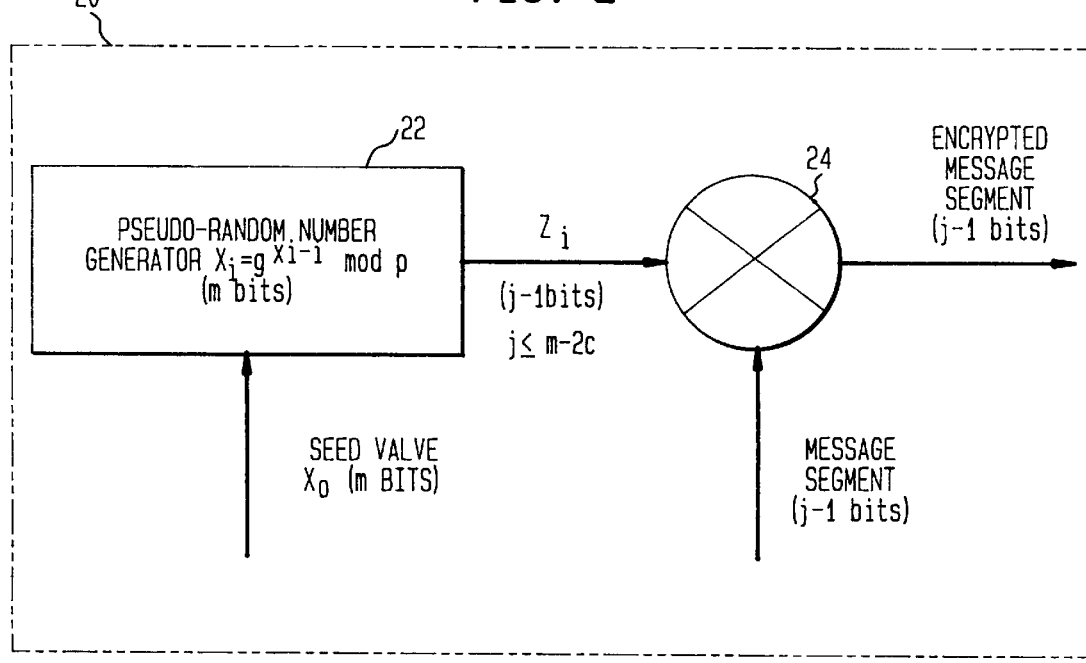
FIG. 2 depicts a functional block diagram of a transmitter comprising a cryptographic device for encrypting messages used in accordance with the present invention.

FIG. 2 depicts a functional block diagram of a transmitter 20 comprising a cryptographic device for encrypting messages used in accordance with the present invention. The cryptographic device comprising pseudo-random number (PN) generator 22 and XOR operator 24. PN generator 22 is a device for outputting pseudo-random numbers, such as an n stage maximal length shift register or an ASIC executing a pseudo-random number generator program. PN generator 22 is defined by the following modular exponential function:

$$x_i g_{x_{i-1}} \bmod p \qquad \text{(equation 4)}$$

wherein $x_i$ is a value comprising m bits, p is a prime number comprising k bits, g is a generator of integer mod p, and $1 < i \leq n$. Since equation 4 is a modular exponential function, the value of m is less than or equal to k (i.e., $m \leq k$).

The values of m and k are chosen such that it would be difficult or hard to solve a discrete logarithm problem for the modular exponential function of $x_i$ using any of the well-known techniques for solving discrete logarithm problems, such as the index calculus technique and the square root technique, wherein difficulty or hardness is expressed in terms of requiring $2^c$ number of operations to solve the discrete logarithm problem and c represents a cryptographic security threshold level. Specifically, the value of k should be chosen such that $2^c$ is approximately equal to or less than $$O(2^{\alpha \sqrt{\log_2 p \times \log_2 \log_2 p}}),$$

and the value of $m$ should be chosen such that $2^c$ is approximately equal to or less than $\sqrt{2^m}$. For example, if the degree of difficulty sought to be attained is at least $2^{64}$ (i.e., $c \geq 64$), then $k \geq 512$ and $m \geq 128$.

Value $x_i$ is generated initially by providing PN generator 22 with seed value $x_0$, which is a secret value comprising m bits and known only to the transmitter 20 and an intended receiver. Thus, $x_1$ is equal to $g^{x_0} \bmod p$. Value $x_1$ is used to generate $x_2$ (i.e., $x_2 = g_x^1 \bmod p$), which is then used to generate $x_3$, and so on. Although PN generator 22 generates all m bits of $x_i$, it only outputs pseudo-random numbers $z_i$ comprising aj–1 bit size segment of $x_i$. The value of j being some value less than or equal to m–2c. In one embodiment, the pseudo-random number $z_i$ comprises the j least significant bits of $x_i$ excluding the least significant bit of $x_i$ (i.e., $x_i$ segment includes the second least significant bit of $x_i$ through the jth least significant bit of $x_i$). See FIG. 3, which depicts a diagram of the pseudo-random generator 22 (defined by equation 4) generating a value $x_i$ and outputting the j least significant bits excluding the least significant bit. For illustrative purposes, the remainder of this application will be described herein with respect to a pseudo-random number generator that outputs pseudo-random numbers $z_i$ comprising the second least significant bit of $x_i$ through the jth least significant bit of $x_i$. This should not, however, be construed to limit the present invention in any manner.

As described in the section entitled "Proof" below, the degree of difficulty in breaking this PN generator (which outputs, for example, the second through jth least significant bits of $x_i$) is equivalent to solving a discrete logarithm problem for a short exponential function $$y = g^s \bmod p \qquad \text{(equation 5)}$$

wherein y is a value comprising m bits, s is a short exponent comprising 2c bits, p is the prime number comprising k bits, and g is the generator of integer mod p. Since equation 5 is a short exponential function, the value of 2c is typically much less than the values of m and k (i.e., $2c<<m \leq k$).

If the discrete logarithm problem for the short exponential function of y is difficult to solve, then the PN generator of the present invention is difficult to break. The values of c and k are chosen such that it would be difficult to solve the discrete logarithm problem for the short exponential function of y using any of the well-known techniques for solving discrete logarithm problems, such as the index calculus technique and the square root technique. For example, suppose the degree of cryptographic security sought to be attained is at least $2^{64}$ (number of operations) to solve the discrete logarithm problem for y. Then the value of k should be at least comprise 512 bits and m should at least comprise 128 bits—that is, if $k \geq 512$ and $m \geq 128$, then at least $2^{64}$ number of operations are required to break the pseudo-random number generator of equation 4 outputting the j least significant bits excluding the least significant bit. If at least $2^{64}$ number of operations are also required to solve the discrete logarithm problem of equation 4, then $2 \times 2^{64}$ (i.e., $2^{65}$) combined number of operations are required to solve both discrete logarithm problems (for $x_i$ and y). Since PN generator 22 is defined by a modular exponential function (of equation 4), then the value of m could be as large as the value of k. If the value of k is 512 (or 1024), then the value of m could be as large as 512 (or 1024). Accordingly, when k is 512 (or 1024) and c is 64, PN generator 22 can output pseudo-random numbers $z_i$ as large as 383 (or 895) bits, which is substantially larger than the bit sizes of the pseudo-random numbers being outputted by prior art PN generators.

Figure 3:
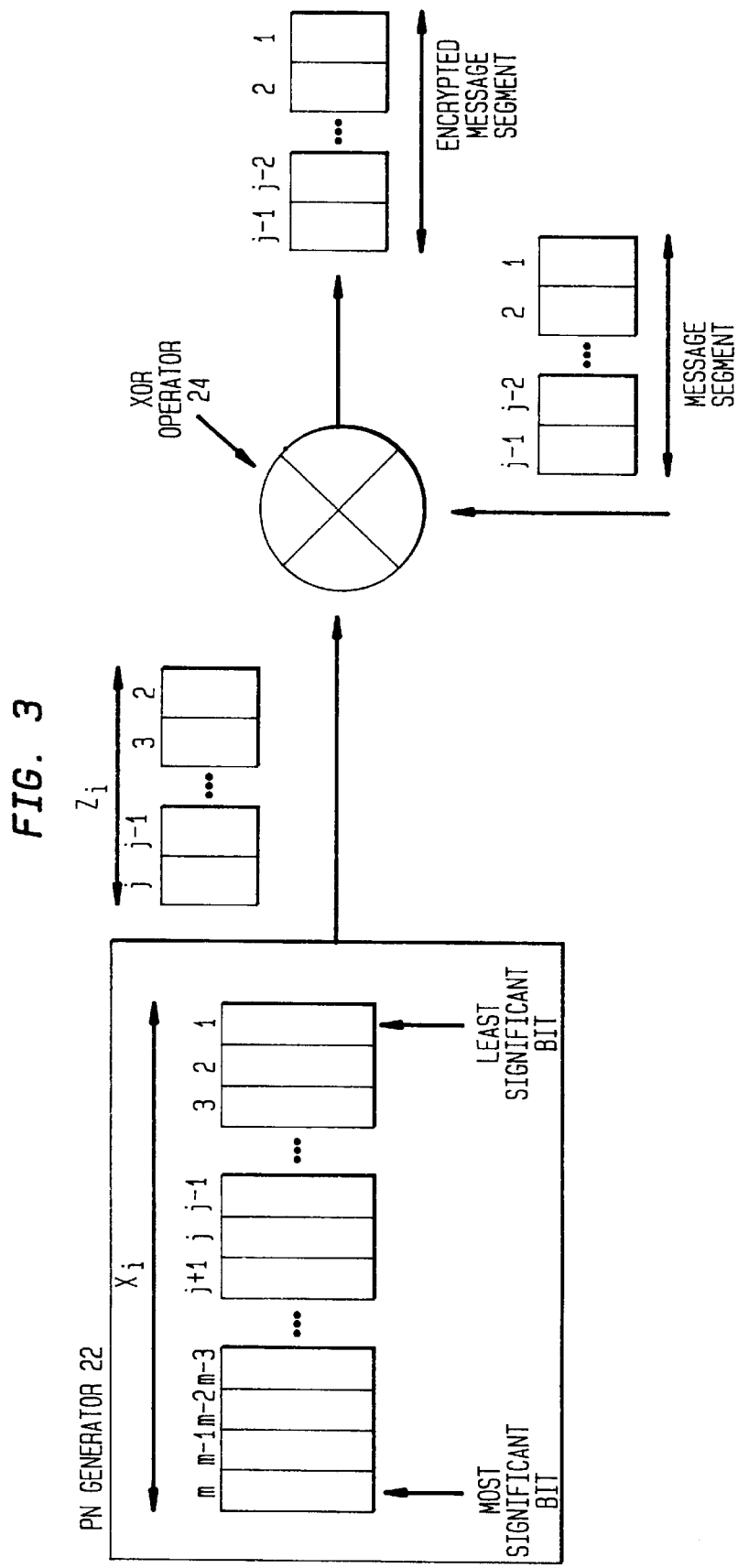
FIG. 3 depicts a diagram of the pseudo-random generator of FIG. 2 generating a value $x_i$ and outputting the j least significant bits excluding the least significant bit.

PN generator's 22 output (i.e., pseudo-random number $z_i$) is provided as input to XOR operator 24, which is a device for performing XOR operations, such as an XOR gate or an ASIC executing an XOR operation. XOR operator 24 receives PN generator 22's output and XORs it with an equal size segment of a message to produce an encrypted message segment comprising j–1 bits, as shown in FIG. 3. Note that XOR operator 24 may be replaced with any other device for combining the bits of the PN generator's output with the bits of the message.

The encrypted message is subsequently transmitted by the transmitter 20 to a receiver comprising a pseudo-random number generator defined by the same exponential function and an XOR operator. If the receiver is the intended receiver, the seed value $x_0$ would be known or determinable by the receiver. Thus, the intended receiver would be able to generate the same pseudo-random numbers $z_i$ as those generated by the transmitter. The pseudo-random numbers $z_i$ could then be used to decrypt the encrypted message segments, therefore allowing the intended receiver to comprehend the transmitted message.

Proof

Introduction

A function f is said to be one way if it is easy to compute but hard to invert. With appropriate selection of parameters, the discrete exponentiation function over a finite field, $g^x$ mod p where g is a generator of the cyclic group of non zero elements in the finite field, is believed to be a one way function. The intractability of its inverse, the discrete logarithm problem, is the basis of various encryption, signature and key agreement schemes. Apart from finite fields, other finite groups have been considered in the context of discrete exponentiation. One such example is the group of points on an elliptic curve over a finite field. Koblitz and Miller (independently) [Ko], [Mil], considered the group law on an elliptic curve to define a public key encryption scheme suggesting that elliptic curve addition is also a one way function. Another number theoretic problem that is considered to be hard is the problem of factoring integers. Examples of functions relying on factoring which are believed to be one way are the RSA and Rabin functions. Closely related to factoring is the problem of deciding quadratic residuosity modulo a composite integer.

A concept which is intimately connected to one way functions is the notion of hard bits. Based on one way functions, Blum & Micali were the first to introduce the concept of hard bits. Informally, a hard bit B(.) for a one way function f(.) is a bit which is as hard to compute as it is to invert f. Blum and Micali showed that the most significant bit is a hard bit for the discrete logarithm problem over a finite field. To be precise, their notion of most significant bit corresponds to the Boolean predicate which is one if the index of the exponent is greater than (p–1)/2 and zero otherwise. They defined and proved this hard bit and successfully used it to show the importance of hard bits in secure pseudo random bit generation. Soon after, the hard bits of RSA & Rabin functions were also discovered by Ben-Or-et al [BCS] which led to a new secure pseudo random bit generator. In 1986, Blum, Blum and Shub [BBS] used the quadratic residue problem over a composite integer to design yet another secure pseudo random bit generator. Their work was based on the security of the quadratic residue problem which was investigated by Goldwasser and Micali [GM84]. Later Goldreich and Levin [GL] proved that all one way functions have a hard bit. More generally they were able to show that for any one way function a logarithmic number of one bit hard predicates exist. This in particular proves the existence of at least a logarithmic number of secure pseudo random bit generators attached to a given one way function. The use of pseudo random bits in cryptography relates to one time pad style encryption and bit commitment schemes, to name a few.

All the above generators based on one bit predicates suffer from the same problem, namely they are too slow. All of them output one bit per modular exponentiation. The concept of simultaneous hardness is the first step in speeding things up. Intuitively, the notion of simultaneous hardness applied to a group of bits associated to a one way function f states that it is computationally as hard as the inverse of the one way function to succeed in computing any information whatsoever about the given group of bits given only f(x). Using this notion one can extract collections of bits per operation and hence the speed up. Long and Widgerson [LW] were the first to show that log log p bits of the discrete log modulo a prime number p are simultaneously hard. On the other hand the works of Vazirani and Vazirani [VV] and Alexi-et al [ACGS] address the notion of simultaneous hardness of RSA and Rabin bits. Later Kaliski showed individual hardness of bits (in the Blum Micali sense) of the elliptic curve group addition problem using a novel oracle proof technique applicable to any finite Abelian group. His methods extend to show simultaneous hardness (stated but not proved in the paper) of log n bits where n is the order of the group, [Ka]. More recently, Hastad, Schrift and Shamir [HSS], have designed a much more efficient generator which produces n/2 bits per iteration where n is the number of bits of the modulus. The one way function they have considered is the discrete exponentiation function modulo a composite integer (to be precise a Blum integer). Once again the method of generation relies on the proof that n/2 bits of every iteration are simultaneously hard. The use of a composite modulus allows them to relate individual and simultaneous hardness of bits to factoring the modulus. In all these works the common strings are the results of Yao contained in his seminal work [Y] which laid the foundations to a complexity theoretic approach to cryptography which paved the way for a quantification of security in terms of known hard problems.

In this paper we construct a very efficient cryptographic pseudo random bit generator attached to modular exponentiation in a finite field. We show that $n-O(\log n)^+$ bits of every iteration are simultaneously secure where $O(\log n)^+$ is equal to the smallest non polynomial quantity in $\log n$. Hence each iteration produces more bits than any other method discovered so far. The novelty in this work is to relate the security of the random bit generation to the problem of solving the discrete logarithm with short exponents. The motivation for this technique is derived from the above mentioned work of Hastad-et al where although they are using a modular exponential function modulo a composite, the security of the system is related to factoring the underlying modulus. In a similar but not so obvious sense, we use exponential in a finite field for the generation but relate the security to the strength of the discrete log problem (over the same prime modulus) but with short exponents. In this paper an oracle for the i-th bit gives the value of i-th bit when the binary representation is used for the argument. This is a different representation of the i-th bit than that used by Blum-Micali and Long-Widgerson. Also, our representation is the same as the representation that Hastad-et al have considered. The paper is organized as follows: In section 2 we discuss the discrete log problem and in particular the short exponent discrete log problem. Details of the oracles and hardness of bits are formalized in this section. In section 3 we show that the trailing $n-O(\log n)^+$ bits are individually hard with respect to the discrete logarithm problem with short exponents. In section 4 we prove simultaneous hardness of $n-O(\log n)^+$ bits. Once again this is with respect to the discrete log with short exponents problem. In section 5 we discuss the design of the system and provide the proof of security and conclude in section 6. In the appendix, we discuss some extensions of this work to include other Abelian groups and possible ways to improve the efficiency of the pseudo random generator.

The Discrete Logarithm Problem

We first define the discrete logarithm problem. Let p be a prime and g a generator for $(Z/(p))^*$, the multiplicative cyclic group of nonzero elements in the finite field of order p. Then for $1<=x<=(p-1)$ the function $g^x \mod p$ defines a permutation.

Problem 1

The discrete logarithm problem is to find x given y in $(Z/(p))^*$ such that $g^x \mod p=y$. Let $n=\log p$ be the length of p in binary, then $g^x \mod p$ is computable in Poly (n) time. However, there is no known deterministic or randomized algorithm which can compute the discrete logarithm in Poly (n) number of steps. The best algorithm to compute the discrete logarithm in a finite field of order p, is the index calculus method. Even this is not feasible if p is appropriately large (e.g. 1024 bits) since the complexity is sub-exponential and not polynomial in n. On the other hand for primes such that (p-1) consists of only small factors, there are very fast algorithms whose complexity is equal to the complexity of the discrete log in a field whose cardinality is equal to its largest prime factor. This algorithm is due to Pohlig and Hellman [PH].

Discrete Logarithm with Short Exponents

For efficiency purposes the exponent x is sometimes restricted to c bits (c=128 or 160 bits) since this requires fewer multiplication. There are square root time algorithms to find x in square root of c steps, due to Shanks [Sh] and Pollar [Po]. Thus c should be at least 128 bits to provide 64 bits of security. By this we mean an attacker should perform at least $2^{64}$ number of operations in order to crack the discrete logarithm using these algorithms. At the moment, there is no faster way to discover the discrete logarithm even with x so restricted.

We will also restrict x, in particular, we will restrict it to be slightly greater than $O(\log n)$ bits, but not to save on multiplication. The exact size of the exponent will be denoted $O(\log n)^+$, where the superscript + indicates that it is greater than any polynomial in $\log n$. Hence even with the square root attack one needs greater than $2^{O(\log n)}$ steps or greater than a polynomial in n number of steps.

The hard problem we consider in this paper is the inverse of this special case of the discrete exponentiation function. To be precise, we consider the case of modular exponentiation in a finite field of order p (a prime number) with short exponents. The inverse of this problem is the discrete logarithm with short exponents (DLSE). In other words:

Problem 2

Let p be a large bit prime which has at least one large prime factor. Let x be an integer which is significantly smaller compared to p. Let g be a generator of the cyclic group of nonzero elements in the finite field of integers modulo the chosen prime p. Given g and $g^x=y$, find x.

The DLSE problem has been scrutinized and a summary of the results are presented in [OW], where they study this problem in the context of the Diffie-Hellman key agreement scheme. The use of short exponents in the Diffie-Hellman protocol is to speed up the process of exponentiation. Typically the cost of computing $g^x$ is linearly related to the bit length of x, hence real-time computing costs have motivated the use of low order exponents. Care is necessary to ensure that such optimizations do not lead to security weaknesses. The above mentioned paper [OW], presents a set of attacks and methods to rectify the situation. In particular their conclusions suggest the use of safe primes.

Another example of the use of shorter exponents is in the generation of digital signatures. The digital signature standard (DSS) published by the NIST [DSS] is based on the discrete logarithm problem. It is a modification of the ElGamal signature scheme [EG]. The ElGamal scheme usually leads to a signature having 2n bits, where n is the number of bits of p (the modulus). For potential applications a shorter signature is desirable. DSS modifies the ElGamal scheme so that a 160 bit message is signed using a 320 bit signature but computations are all done modulo a 512 bit prime. The methodology involves the restrictions of all computations to a subgroup of size $2^{160}$. The assumed security of the scheme is based on two different but very related problems. First of these is the discrete log in the entire group which uses a 512 bit modulus, where the index calculus algorithm applies. The second is the discrete log problem in the subgroup of the cyclic group of nonzero elements in the finite field. Here Shanks's square root algorithm reduces the complexity to $O(2^{80})$ since the exponent is only 160 bits.

Hardness of Bits

As indicated in the introduction, the notion of hard bits is very characteristic of every one way function. In particular hardness of bits with respect to the discrete logarithm has been extensively studied. In this paper we define a mild variation of hard bits.

Definition 1

Let f and f' be one way functions, where $R\_f$ is the range of f. Let $B: R\_f$ to $\{0,1\}$ be a Boolean predicate. Given $f(x)$ for some x, the predicate B(x) is said to be f'-hard if computing B(x) is as hard as inverting f'.

Normally when we discuss hard bits, f and f' are the same. For example, discovering the Blum-Micali bit is as hard as computing the discrete logarithm. But in this paper we allow f and f' to be different. An example of this new phenomenon, is discrete exponentiation modulo a composite modulus. Here the discrete logarithm in the ring of integers modulo a composite is a hard function, and so is factoring. Here given $g^x$ for some fixed g and generic x, finding individual bits of this discrete logarithm is as hard as factoring. This was proved by Hastad-et al in [HSS]. In this paper we consider a similar situation. We consider the one way function of discrete exponentiation, but we prove that the n–O(log n)$^+$ bits of the exponent are DLSE-simultaneously hard. The best previous result showed simultaneous hardness of n/2 of the bits [HSS], but our result shows simultaneous hardness for almost all the n bits. Our results are maximal as far as the discrete logarithm is concerned. In other words if in any iteration we drop only O(log n) bits, then any attacker can compute the seed of the generator by making a polynomial number of guesses. Hence one cannot improve on these results regarding number of bits produced per iteration any further.

Binary Representation

The number x can be represented in binary as $b_{n-1}2^{n-1}+b_{n-2}2^{n-2}+\ldots+b_12+b_1$ where $b_i$ is either 0 or 1. The i-th bit problem is to discover the value of $b_i$ of x. The i-th bit is hard if computing it is as difficult as computing the entire logarithm. If we had an oracle, $O^i(g,p,y)$, which outputs the value of $b_i$ then the bit is hard if there is a Poly(n) time algorithm which makes Poly(n) queries to the oracle $O^i(g,p,Y)$ for various values of Y and computes the entire value of x. We know the least significant bit is not hard because there is a Poly (n) time algorithm to compute it, namely by computing the Legendre symbol.

An imperfect oracle, $O\_epsilon(p,g, Y)$, is usually defined as an oracle which outputs the correct bit value with probability greater than 1/2+1/Poly (n).

Blum-Micali Representation

In this paper, we will use the binary representation when we discuss the security of the i-th bit, however, we want to mention another interpretation of i-th bit. Blum-Micali introduced a particular bit predicate, B(x) and showed its hardness. B(x) is 0 if 0<=x<=p–1/2 and B(x) is 1 if p–1/2<x<= p–1. This is sometimes referred to as the most significant bit of x and it is clearly different from the most significant bit of x under the binary representation. Others [LW] have extended the definitions to define the k most significant bits. Often the Blum-Micali representation is used to refer to the most significant bits, while the binary representation is used for the least significant bits. In this paper we will use the binary representation when referring to the i-th bit, unless specified otherwise.

Individual Hardness of Bits

In this section, we discuss the security of the trailing n–O(log n)$^+$ bits, where O(log n)$^+$ is as defined earlier. To be precise we show that except the least significant bit, all the n–O(log n)$^+$ lower bits are individually hard with respect to the DLSE problem. Based on definition 1, this amounts to proving the bits of the discrete logarithm are DLSE-hard.

Let $O^i(g,y,p)$ be an oracle which gives the i-th bit (for any i in [2,n–O(log n)$^+$]. Note that i increases from right to left and i=1 for the least significant bit. Given this oracle we show that in polynomial number of steps we can compute the short exponent discrete logarithm. In addition, we prove hardness of individual bits by showing that given $O^i{}_{epsilon}$ (g,y,p) with epsilon advantage to predict the i-th bit (for any i in the prescribed range) which runs in polynomial time, we can turn this into an algorithm to compute the discrete logarithm of a short exponent by making polynomial number of queries to this oracle. For the rest of the paper we will refer to lower k bits to mean lower k bits excluding the least significant bit, for any k.

Theorem

The lower n–O(log n)$^+$ bits are DLSE—individually hard.

Proof: According to definition 1, it is enough to show that given $O^i$ (g,y,p) we can compute log y for all y such that x=log y is a short exponent. Without loss of generality, let us assume that p–1=2q, where q is an odd integer.

(a) Perfect Oracles—$O^i$ (g,y,p). We are given $g^x$ and g and we know in advance that x is small (consisting of O(log n)$^+$ bits). Now, computing the least significant bit is always easy, via the Legendre symbol. Hence we compute it and set it to zero. Let i=2 and suppose we have an oracle for the 2nd bit. If this is a perfect oracle then we compute the second bit. Once this is computed then we set it to zero and we will continue to refer to the new number as $g^x$. Next we compute the square roots of $g^x$. The roots are $g^{x/2}$ and $g^{x/2+(p-1)/2}$ where we refer to the former as the principal square root. Since the two least significant bits of $g^x$ are zero, we know that the principal square root has LSB equal to zero (or equivalently Legendre symbol one). This allows us to identify the principal square root. Now run the oracle on the principal square root and compute the second least significant bit. This bit is really the third least significant bit of x. Once again, set this bit to zero and repeat the process. Clearly, in poly(n) steps we would have computed x one bit at a time from right to left. Now, when i>2 we square $g^x$, (i–1) times. Then the 2nd LSB is at the i-th position, and we run the oracle to compute this bit. Zero this bit and once again compute square roots.

The principal square root corresponds to the root with LSB equal to zero. Now the (i+1)-th of x can be computed by running the oracle on the principal square root. Continue this process and in k steps where k=log x, we would know x.

(b) Imperfect Oracles—$O^i{}_{epsilon}$(g,y,p). Suppose we have an imperfect oracle which succeeds in finding the i-th bit in only epsilon more than fifty percent of the x in (Z/(p))*. Then we can concentrate the stochastic advantage and turn this oracle into an oracle which answers any specific instance correctly with arbitrarily high probability.

We divide the proof into two parts
  (i) The lower 2 times O(log n) bits are individually hard.
  (ii) The middle n–O(\log n)$^+$to 2 times O(log n) bits are individually hard.

(i) Suppose we have an imperfect oracle whose advantage is epsilon, i.e., the oracle can give the correct answer on epsilon more than fifty percent of the possible inputs (and we do not know which ones). Then let r_j be a sequence of polynomial number of random numbers between 1 and p–1. We run the oracle on $g^{x+r_j}$, where the LSB of x is zero. Via the weak law of large numbers, a simple counting of the majority of 1's and 0's of the oracle output (after neutralizing the effect of the random number)for the second LSB yields this bit. Now compute the square roots and pick the principal square root as earlier. Once again repeat the process with a fresh set of random numbers to discover the next bit. Clearly in poly(n) steps we would have discovered x one bit at a time from right to left. The proofs are omitted, and we refer to [Pe] for details.

Suppose $i>2$. Then we square $g^{x}$ $i-1$ times, and repeat the above process and conclude that any oracle which has an $\epsilon$ advantage will lead to a polynomial time algorithm to compute $x$. The only aspect that needs additional mention is the fact, when we randomize it is possible that for some $r\_j$ when we add them to the exponent we may exceed $p-1$. We refer to this as cycling. Assuming that we pick our random numbers uniformly, then we argue that the probability of this cycling is bounded above by $\frac{1}{poly(n)}$ and hence we need to increase the number of queries by a certain amount corresponding to the drop in cycling. Once again the details of the proofs are omitted and the reader is refereed to Blum-Micali [BH], for the techniques.

(ii) The proof of this step is also similar to the second part of the proof of (i) except that one has to set the initial $t$ bits to zero by guessing, before we start the randomizing process. Here $t$ is again a poly($\log n$) number and hence the probability of cycling is bounded above as earlier. Once again the details are omitted for brevity and will be included in an expanded version of this paper.

Suppose i>2. Then we square $g^x$i−1 times, and repeat the above process and conclude that any oracle which has an epsilon advantage will lead to a polynomial time algorithm to compute x. The only aspect that needs additional mention is the fact, when we randomize it is possible that for some $r_j$ when we add them to the exponent we may exceed p−1. We refer to this as cycling. Assuming that we pick our random numbers uniformly, then we argue that the probability of this cycling is bounded above by 1/poly(n) and hence we need to increase the number of queries by a certain amount corresponding to the drop in cycling. Once again the details of the proofs are omitted and the reader is referred to Blum-Micali [BH], for the techniques.

(ii) The proof of this step is also similar to the second part of the proof of (i) except that one has to set the initial t bits to zero by guessing, before we start the randomizing process. Here t is again a poly(log n) number and hence the probability of cycling is bounded above as earlier. Once again the details are omitted for brevity and will be included in an expanded version of this paper.

Discrete Logarithm Hides Almost n bits

In this section we prove the simultaneous hardness of n−O(log n)$^+$ lower bits of the index in modular exponentiation. Intuitively, given a generator g of a finite field of order p, and $g^x$ for some x then we show that gaining any information about the trailing n−O(log n)$^+$ bits is hard. Here hardness is with respect to the DLSE problem. In other words, for any prime p given a random generator g and a random element $g^x$ of the finite field, any information on the relevant bits of x can be converted into an poly(n) algorithm to solve the DLSE problem. Now, the phrase gaining any information is rather vague, and this is clarified by the concept of simultaneous security which is defined below for any generic one way function.

Definition 2

Let f be a one way function. A collection of k bits, $B^{k(x)}$ is said to be simultaneously secure for f if $B^{k(x)}$ is easy to compute given x and for every Boolean predicate B an oracle which computes $B(B^{k(x)})$ correctly with probability greater than ½ given only f(x) can be used to invert f in Poly(n) time.

In this paper we will be employing a modified notion of simultaneous security relative to a possibly different one way function.

Definition 3

Let f and f be one way functions whose range is [0,N] A k-bit predicate $B^k$ is said to be f-simultaneously hard if given f(x), for every non-trivial Boolean predicate B on k bits, an oracle which outputs $B(B^{k(x)})$ can be used to invert f in polynomial time. If $B^k$ is a f' hard predicate then we say the bits of $B^{k(x)}$ are f-simultaneously hard.

The above definition, although precise, is not easy to apply when understanding simultaneous security. A more working definition is provided in definition 4, phrased in the language of the discrete logarithm problem over a prime modulus.

Definition 4

The bits of the exponentiation function $g^x$ mod p at location j<=i<=k are DLSE-simultaneously hard if the [j,k] bits of the discrete logarithm of $g^x$ mod p are polynomially indistinguishable from a randomly selected [j,k] bit string for random chosen (g, p, $g^x$ mod p). In addition any polynomial indistinguishability will lead to an oracle which solves the DLSE problem in polynomial time.

Once again, proving polynomial indistinguishability of a group of bits as above is difficult. But the notion relative hardness helps alleviate this problem and in fact leads to a test of simultaneous security.

Definition 5

The $i^{th}$ bit, j<=i<=k, of the function $g^x$ mod p is relatively hard to the right in the interval [j,k] if no polynomial time algorithm can, given a random admissible triplet (g, p, $g^x$ mod p) and in addition given the k-i bits of the discrete logarithm of $g^x$ to its right, computes the i the bit of the discrete logarithm of $g^x$ with probability of success greater than ½+1/poly(n) for any polynomial poly(n) where n=log p.

Based on this definition, we have a test for simultaneous security. The statement of this test is the following theorem.

Theorem 1

Definitions 4 and 5 are equivalent.

The proof of this equivalence for non-biased bits is basically the well-known proof of the universality of the next bit test due to Yao [Y]. This proof technique is explained in [BH]. Now, using this theorem and the intractability of the DLSE problem we show that the trailing n−O(log n)$^+$ bits are simultaneously hard.

Theorem 2

The n−O(log n)$^+$ trailing bits of $g^x$ mod p are simultaneously hard, with respect to the DLSE problem.

Proof: It is sufficient to show that every trailing bit of $g^x$ is relatively hard to the right in the interval [2,n−O(log n)$^+$]. Note that, individual hardness of bits does not imply the simultaneous hardness of all bits. Following the definitions and theorem above we know that, in order to show simultaneous security, we are allowed to use only a weak oracle: given $g^x$, to predict the $i^{th}$ bit of x, all the i−1 trailing bits of the unknown x should also be given to the oracle. This is a very hard task in general.

Assume the theorem is false. Then, for some i in [2,n−O(log n)$^+$] there exists an oracle which when supplied with the trailing i−1 bits of a generic $g^x$ succeeds in predicting the $i^{th}$ bit of x with advantage epsilon where epsilon is 1/poly(n). Now pick an element $S=g^s$ where s is a short exponent. We can shift s to the left by squaring S the appropriate number of times. Since 0<=i<n−O(log n)$^+$ we can shift s by i−O(log n) bits to the left without cycling. Recall, by cycling we mean the exponent exceeds p−1 and hence its remainder modulo p−1 replaces the exponent. Now the 2nd LSB of s rests on the $i^{th}$ bit and we can run the oracle repeatedly by multiplying by $g^r$ mod p where r is a random number between 0 and p−1. In order to make sure that the probability of cycling is low we may have to set the t=poly(log n) leading bits of s to zero which we can exhaustively guess and run the algorithm for each guess. At the end of the algorithm we have a candidate and we can see if $g^{candidate}$ equals S. If it does then we stop or else repeat the algorithm with another guess. Since we will continue to have an epsilon'>=epsilon−1/t advantage we can deduce the bit from the oracle in poly(n) time. We know the 2nd LSB of s in this manner. We set that bit to zero, and take the square root of the number. Of the two roots we should pick the one which is the quadratic residue because all the lower bits are zero to begin with and hence the square root should have a zero in the LSB. Now the next bit of s is in the $i^{th}$ position and we can run the oracle repeatedly to discover this bit and so on to recover all the bits of s. Note the Oracle is very weak unlike the case for the individual bit oracle. The oracle here will tell you the $i^{th}$ bit with epsilon advantage provided you also supply all the i−1 bits to the right of i. However we are able to do this because all the bits to the right of the shifted s are known to be zero, since we started with a short exponent. Now we have shown that for every i such that 2<=i<O(log n) we can use this weak oracle to discover s thus we have shown the trailing bits to be simultaneously hard provided the function $g^s$ mod p with s of size $O(\log n)^+$ is hard to invert.

Pseudo Random Bit Generator

In this section we provide the details of the new pseudo random bit generator. In particular we extend the scheme used by Blum-Micali [BM] to extract more bits. This is the same scheme that Long-Widgerson [LW] used in their generator but their output consisted of log n bits per iteration. In our new scheme we produce $n-O(\log n)^+$ bits per iteration. Recall from section 2 that the Blum-Micali scheme used a mildly different definition of "bits". We use the same definition of bits as Hastad-et al, but we do not encounter the difficulties they did in defining the generation scheme since our exponentiation induces a permutation on $\{Z_p\}^*$.

NEW GENERATOR: Pick a seed $s_0$ from $\{Z_p\}^*$. Define $s_{i+1}=g^{\{s_i\}}$ mod p. At the $i^{th}$ step (i>0) output the lower $n-O(\log n)^+$ bits of $s_i$, except the least significant bit.

Proof of Security

Suppose A is an epsilon-distinguisher of the 1 (1 is poly in n) long output of our generator, then there is a (epsilon/1)-distinguisher for any output at the $i^{th}$ step. In particular there is a (epsilon/1)-distinguisher for n−O(log n) bits of $s_0$. According to our definitions in the previous section, due to Yao [Y], we can use a distinguisher to create a weak oracle which will tell us the $i^{th}$ bit of x provided we also give it the right most i−1 bits of x.

Now we note that we can use this to discover x given $g^x$ mod p where x is slightly larger than O(log n). We repeatedly invoke the "oracle" by setting $s_0=\{g^x\}\{g^r\}$. Thus we can discover the i bit in poly(n) time.

Using techniques shown in theorem 3 we can discover the entire x. So if the output sequence of our generator is epsilon-distinguishable then in poly(n) time we can discover x of our exponentiation function. Assuming it is intractable to invert the function $g^x$ mod p where x is slightly larger than O(log n) bits (i.e., short exponent) then the output sequence of our generator is polynomially indistinguishable.

Conclusion

We have shown that the discrete logarithm mod a prime p hides $n-O(\log n)^+$ bits by showing the simultaneous hardness of those bits. The hardness in this result is with respect to the discrete logarithm problem with short exponents, i.e., DLSE-simultaneously hard (as defined in section 2 of this paper).

This allows us to extract $n-O(\log n)^+$ bits at a time for pseudo random generation and other applications. As an example for n of size 1024 bits and s of size 128 bits this allows us to extract almost 900 bits per exponentiation. Spoken informally, we note that the security of this example is $2^{64}$ since it takes $O(2^{64})$ for the best known algorithm to crack a modular exponentiation with 128 bits. Also, if one desires more security at every step then we can decrease the number of bits extracted at every stage. This generator outputs the maximal number of bits from a single iteration. Extracting any more bits in any iteration leads to a prediction of bits—since we would then be dropping O(log n) bits and hence in polynomial number of guesses we would know the complete exponent in every iteration.

BIBLIOGRAPHY

[ACGS] W.\Alexi, B.\Chor, O.\Goldreich and C.\P.\Schnorr, RSA/Rabin bits are 1/2+1/poly(log N) secure, *Proceedings of 25th FOCS*, 449–457, 1984.

[BCS] M.\Ben-Or, B.\Chor, A.\Shamir, On the cryptographic security of single RSA bits, *Proceedings of 15th STOC*, 421–430, 1983.

[BBS] L.\Blum, M.\Blum, and M.\Shub, A simple secure pseudo-random number generator, *SIAM J. Computing*, 15 No. 2:364–383, 1986.

[BM] M.\Blum, and S.\Micali, How to generate cryptographically strong sequences of pseudo random bits, *SIAM J. Computing*, 13 No. 4:850–864, 1984.

[BH] R.\B.\Boppana, and R.\Hirschfeld, Pseudorrandom generators and complexity classes, *Advances in Computing Research*, 5 (S.\Micali, Ed.), JAI Press, CT.

[DSS] U.\S.\Department of Commerce/ N.I.S.T, *Digital Signature Standard*, FIPS 186, May 1994.

[GL] O.\Goldreich, and L.\A.\Levin, A hard-core predicate for all one way functions, *Proceedings of 21st STOC*, 25–32, 1989.

[GM] S.\Goldwasser, and A.\Micali, Probabilistic encryption, *Journal of Computer and Systems Science*, 28: 270–299, 1984.

[HSS] J.\Hastad, A.\W.\Schrift, and A.\Shamir, The discrete logarithm modulo a composite modulus hides $O(n)$ bits, *Journal of Computer and System Sciences*, 47: 376–404, 1993.

[ILL] R.\Impagliazzo, L.\A.\Levin, and M.\Luby, Pseudo-random generation from one-way functions, *Proceedings of 20th STOC*, 12–24, 1988.

[Ka] B.\S.\Kaliski, A pseudo-random bit generator based on elliptic logarithms, *Advances in Cryptology—CRYPTO '86* (LNCS 263), 84–103, 1987.

[KMO] J.\Kilian, S.\Micali, and R.\Ostrovsky, Minimum resource zero-knowledge proofs, *Proceedings of 30th FOCS*, 474–489, 1989.

[Kn] D.\E.\Knuth, *The Art of Computer Programming* (vol 2): *Seminumerical Algorithms*, Addison Wesley, 2nd edition, 1981.

[Ko] N.\Koblitz, Elliptic curve cryptosystems, *Mathematics of Computation*, 48:203–209, 1987.

[LW] D.\L.\Long, and A.\Widgerson, The discrete log hides $O(\log n)$ bits, *SIAM J. Computing*, 17:363–372, 1988.

[Mi] V.\Miller, Elliptic curves and cryptography, *Advances in Cryptology—CRYPTO '85* (LNCS 218), 417–426, 1986.

[Na] M.\Naor, Bit commitment using pseudo-randomness, *Advances in Cryptology—CRYPTO '89* (LNCS 435), 128–136, 1989.

[OW] P.\van Oorschot, M.\Wiener, On Diffie-Hellman key agreement with short exponents, *Advances in Cryptology—EUROCRYPT '96* (LNCS 1070), 332–343, 1996.

[Pe] R.\Peralta, Simultaneous security of bits in the discrete log, *Advances in Cryptology—EUROCRYPT '85* (LNCS 219), 62–72, 1986.

[PH] S.\C.\Pohlig, and M.\E.\Hellman, An improved algorithm for computing over $GF(p)$ and its cryptographic significance, *IEEE Trans.* IT, 24:106–110, 1978.

[Po] J.\M.\Pollard, Monte Carlo methods for index Compton (mod p), *Mathematics of Computation*, 32, No. 143:918–924, 1978.

[VV] U.\V.\Vazirani, and V.\V.\Vazirani, Efficient and secure pseudo-random number generators, *Proceedings of 25th FOCS*, 458–463, 1984.

[Y] A.\C.\Yao, Theory and applications of trapdoor functions, *Proceedings of 23rd FOCS*, 80–91, 1982.

Appendix

In this section we discuss some extensions of our results which will be addressed in an extended version of this paper.

Improving Efficiency of Computations

Let us focus on the mechanics of the generator. We start with a finite field, and a generator g of its multiplicative cyclic group. Let $s_0$ be a secret seed. Then we define $s_{i+1}=g^{\{s_i\}}$ iteratively. The output of the generator are the trailing $n-O(\log n)^+$bits of $s_i$ for all i>0, where n=log p.

Although the number of bits generated per iteration is large, each iteration involves a large exponent and this could impact on the speed of the generator. Instead, we could start with p, g, and $s_0$ as earlier but at each stage we define $s_{i+1}=g^{\{s_i'\}}$ where $s_i'$=leading $O(\log n)^+$ bits of $s_i$. This will ensure that at each stage we are using short exponents and hence guarantee a significant speed up. This raises some interesting questions.

Question

Will this speed impact the security of the generator?

Note that when we restrict our exponents we no longer have a permutation. Hence the simple construction used here is inapplicable. A possible method of settling this problem is outlined in Hastad et al in the context of discrete logarithms over composite moduli [HSS]. In particular, exploiting a certain hashing lemma proved in [ILL] they construct a perfect extender and the pseudo-random generation is achieved through repeated applications of the extender to a random seed.

Question

Is it possible to adapt techniques from [HSS] to short exponent exponentiation in a finite field and guarantee a speed up of computations and security?

Discrete Logarithms in Abelian Groups

Let G be a finite Abelian group. Let g in G and let $y=g^x$ (where x is unknown and we are using the multiplicative notation to denote the group operation). The discrete logarithm problem in the subgroup generated by g asks for the value of x given g and y. Clearly, the possible values x can take are from 0 to o(g), where o(g) denotes the order of g, and the subgroup generated by g is cyclic.

In this context, Kaliksi [Ka] has shown that under the intractability assumption of the discrete log in the subgroup generated by g the individual bits of x are hard. In this paper the Blum-Micali notion of bits is employed, and the proof of individual hardness is based on a novel and new oracle proof technique.

The main idea being, the identification of bits is based on a correlation function which automatically accommodates cycling and changes in bits due to randomization. In addition, he completely avoids the computation of square roots which is central to several of the other works on individual bit security. This paper also states that log n bits are simultaneously hard. Presumably, the techniques of Long-Widgerson once applied in the framework of generic Abelian groups yields this result.

Now, we note that assuming the discrete logarithm problem with short exponents is also hard in the chosen Abelian group our results on simultaneous hardness of the trailing bits are applicable. Here one could adapt the techniques outlined by Kaliski in order to deduce simultaneous hardness. Once this is shown then a pseudo random generation scheme can be outlined based on techniques developed by Hastad-et al. The main problem is to address the fact that the subgroup generated by g may be a proper subgroup and hence the group operation on g will not produce a permutation of the group to itself. The exact details of the simultaneous hardness and the subsequent scheme of pseudo random bit generation, will be deferred to an extended version of this paper. This result will be very useful when applied to elliptic curves over finite fields.

Bit Commitment Schemes

Several cryptographic schemes require the communicating individuals to commit to a certain message without revealing any information about the contents of the message. Several single bit and multi-bit commitment schemes have been presented in the past. Multi-bit schemes which improve the efficiency of existing protocols are outlined in [KMO]. An example of a multi-bit commitment scheme based on pseudo random bit generators is Naor's scheme [Na]. In [HSS], Hastad et al present a scheme which directly uses exponentiation modulo a composite integer. But all schemes based on pseudo-random generators depend on the efficiency of the generator. Hence the efficiency of the generator presented in this paper suggests that bit commitment schemes can be speeded up. This topic will also be explored later.

Although the present invention has been described in considerable detail with reference to cryptography and communication, other applications and versions are possible. For example, the pseudo-random number generator may be used for simulations and other cryptographic applications. Therefore, the spirit and scope of the present invention should not be limited to the description of the embodiments contained herein.

We claim:

1. A method of providing message encryption using an output of a pseudo-random number generator wherein the pseudo-random number generator is defined by a modular exponential function $x_i = g^{x_{i-1}} \mod p$, where $x_i$ is a value comprising m bits, p is a prime number comprising k bits, g is a generator of integer mod p, and $1 < i \leq n$, and wherein m and k are selected to achieve a desired security threshold level c, and m is further selected to cause the difference term m−2c to be greater than $\log_2 m+1$, the method comprising the steps of:

receiving a seed value $x_0$ for the pseudo-random number generator;

generating a value $x_i$, using the pseudo-random number generator, wherein an initial value of the $x_{i-1}$ term for the generator is the seed value $x_0$;

outputting from the generator a pseudo-random number $z_i$ constituted as j−1 bits of the generated value $x_i$, the pseudo-random number $z_i$ including a second least significant bit of the value $x_i$ and excluding a least significant bit of the value $x_i$, the value j being greater than $\log_2 m$ and no larger than m−2c; and combining the pseudo-random number $z_i$ with a message segment to produce an encrypted message segment.

2. The method of claim 1, wherein the cryptographic security threshold level c is at least 64.

3. The method of claim 1, wherein the value $x_i$ comprises at least 512 bits.

4. The method of claim 1, wherein the value p comprises at least 512 bits.

5. The method of claim 1, wherein the value $x_i$ comprises at least 1024 bits.

6. The method of claim 1, wherein the value p comprises at least 1024 bits.

7. The method of claim 1, wherein the message segment comprises j−1 bits.

8. The method of claim 1, wherein the message segment is combined with the pseudo-random number $z_i$ using an XOR binary operation.

* * * * *